(12) United States Patent
Sase et al.

(10) Patent No.: US 7,170,273 B2
(45) Date of Patent: Jan. 30, 2007

(54) POWER-SUPPLY DEVICE AND HARD DISK DRIVE USING SAME

(75) Inventors: Takashi Sase, Hitachi (JP); Akihiko Kanouda, Hitachinaka (JP); Katsunori Hayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 10/912,149

(22) Filed: Aug. 6, 2004

(65) Prior Publication Data

US 2005/0127881 A1    Jun. 16, 2005

(30) Foreign Application Priority Data

Dec. 16, 2003  (JP)  ............................. 2003-417425

(51) Int. Cl.
*G05F 1/40* (2006.01)
(52) U.S. Cl. ................. 323/285; 323/283; 323/286
(58) Field of Classification Search ............ 323/222, 323/283, 284, 285, 286, 351
See application file for complete search history.

(56) References Cited

U.S. PATENT DOCUMENTS 5,731,731 A  *  3/1998  Wilcox et al. ............. 327/403
6,469,481 B1 * 10/2002  Tateishi ...................... 323/285
6,873,140 B2 *  3/2005  Saggini et al. .............. 323/283

* cited by examiner

*Primary Examiner*—Jessica Han
(74) *Attorney, Agent, or Firm*—Dickstein Shapiro LLP

(57) ABSTRACT

The object of the invention is to compensate an effect of a voltage drop emerging in output voltage by the equivalent series resistance of a power output filter in a power-supply device. To achieve the object, a power-supply device wherein the power output filter that passes output power and first and second filters provided separately from the power output filter are provided, the first filter provided separately and one input terminal of an error amplifier are connected, new reference voltage acquired by adding differential voltage between the output of the second filter provided separately and the output of the power output filter to reference voltage is input to the other input terminal of the error amplifier and an output signal is fed back to the error amplifier is provided. According to the power-supply device, a voltage drop by equivalent series resistance emerging the output voltage of the power-supply device can be compensated.

17 Claims, 14 Drawing Sheets

FIG. 1
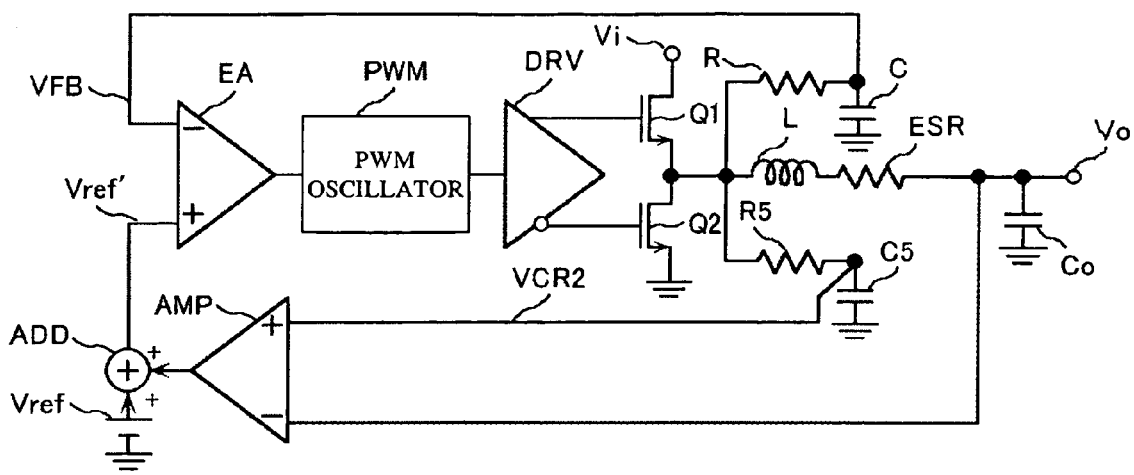
FIG. 2 A
FIG. 2 B
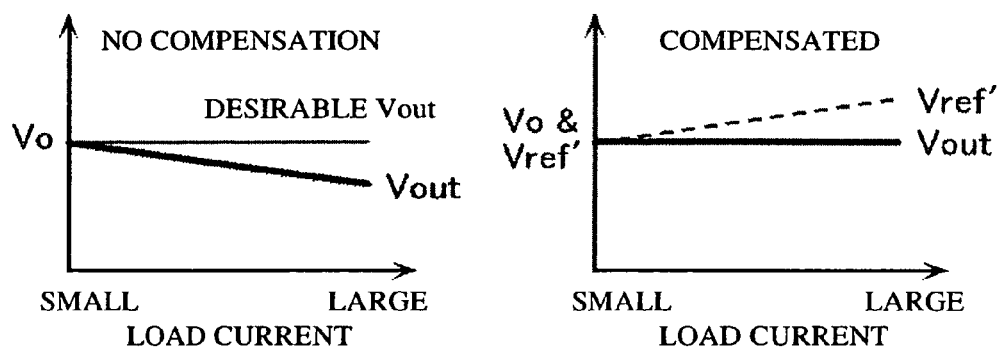

WORKING STATE MODE

| VOLTAGE LEVEL | | LOGICAL VALUE AT POINT a | LOGICAL VALUE AT POINT b | SWITCH DRIVEN STATE | DUTY α |
|---|---|---|---|---|---|
| Vout | (a) | L | L | SW1, 4 : on<br>SW2, 3 : off | 0% |
| | +Δ<br>↑ (b)<br>Vref'<br>↓<br>−Δ | L | H | SW1~4 : all off | DESIRED α |
| | (c) | H | H | SW1, 4 : off<br>SW2, 3 : on | 100% |

V/I3 & V/I4

V/15 & V/16

POWER-SUPPLY DEVICE AND HARD DISK DRIVE USING SAME

FIELD OF THE INVENTION

The present invention relates to a power-supply device and a hard disk drive using the same.

BACKGROUND OF THE INVENTION

As a first-order feedback control power supply system of a power-supply device feeds back a part of the output of a CR smoothing filter provided in parallel with an LC output filter to an error amplifier for control, proper output voltage acquired in the LC output filter is outside a control loop. Therefore, a phenomenon that output voltage drops by an effect upon load current of the equivalent series resistance (ESR) of an inductor L of the LC output filter occurs. The phenomenon becomes remarkable as output voltage decreases, voltage accuracy in required output specifications is deteriorated in low output such as the output of 1 V and a problem that required specifications cannot be achieved occurs.

Besides, though a power supply control system, a circuit block and a purpose are different, there is an example in which a CR filter is provided to both ends of an inductor L for a detector of over-current and current (for example, a patent document 1). In this case, it is a condition that relation of L/ESR=C·R is met.

Patent document 1: JP-A 2000-227808

SUMMARY OF THE INVENTION

The object of the invention is to reduce an effect upon load current of the equivalent series resistance of a power output filter in a first-order feedback control power supply system.

A power-supply device according to the invention is based upon a power-supply device of a step-down type DC-DC converter provided with a power semiconductor switching device, driving means of the power semiconductor switching device, a pulse-width modulation oscillator that supplies a driving signal to the driving means and an error amplifier that supplies to an error signal with reference voltage to the oscillator, and is characterized in that a power output filter that passes output voltage, first and second filters provided separately from the power output filter are provided, the first filter provided separately and one input terminal of the error amplifier are connected and voltage acquired by adding differential voltage between the output of the second filter and the output of the power output filter to reference voltage is fed back to the error amplifier as an output signal by inputting the voltage to the other input terminal of the error amplifier.

According to the power-supply device of the present invention, a voltage drop emerging in output voltage in a loop of first-order feedback of the equivalent series resistance of the power output filter can be compensated.

BRIEF DESCRIPTION OF THE DRAWINGS

FIG. 1 is a circuit block diagram showing a power-supply device equivalent to one embodiment of the invention;

FIGS. 2A and 2B are explanatory drawings for explaining the effect of the compensation of output voltage in the power-supply device shown in FIG. 1, FIG. 2A shows a case that no compensation is made and FIG. 2B shows a case that compensation is made;

DETAILED DESCRIPTION OF THE PREFERRED EMBODIMENTS

Figure 3:
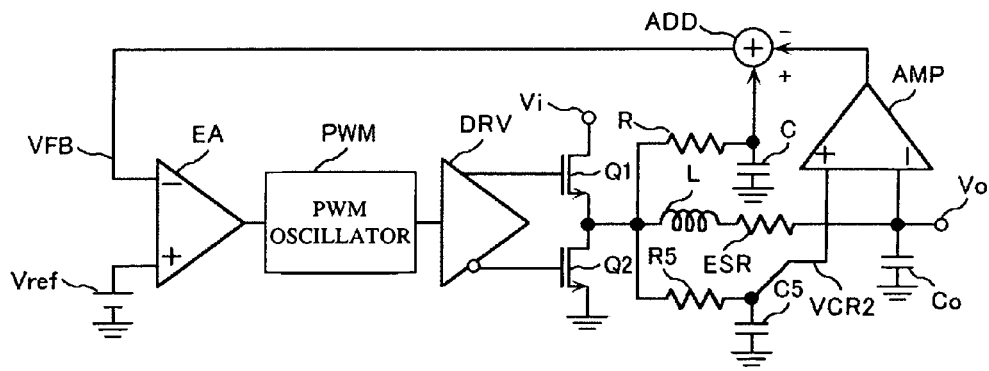
FIG. 3 is a circuit block diagram showing a power-supply device equivalent to another embodiment of the invention.

Embodiments of the invention will be briefly described below.

A power-supply device according to the invention is based upon a power-supply device of a step-down type DC-DC converter, complies with a system of making a signal pass through a CR smoothing filter provided separately from a power LC smoothing filter and feeding back it to an error amplifier and complies with a so-called first-order feedback control system. In this system, a second CR smoothing filter is provided in addition to the CR smoothing filter provided separately from the power LC smoothing filter, differential voltage between the output of the second CR smoothing filter and power supply output is added to the reference voltage of the error amplifier and is input to the error amplifier as new reference voltage. A voltage drop occurs by current flowing in ESR existing in an inductor L of the power LC smoothing filter, however, the decrease of output voltage by the voltage drop is compensated by the method and output voltage in a steady state is constantly kept fixed.

Besides, the power-supply device according to the invention realizes a stable and optimum high-speed response by providing a control circuit that detects the upper and lower limits of the output of the power LC smoothing filter separately from control over the duty of power MOSFET which is a semiconductor switching device in a steady state and means that forcedly sets the duty to 0% or 100% in transient load variation, the determination of which is based upon the new reference voltage as center voltage.

Further, the power-supply device according to the invention is provided with plural power supply device units, is provided with an oscillator and a phase shift circuit respectively common to the plural power supply device units to operate these units in parallel, in a steady state, phases of driving pulses of plural power MOSFETs of each power supply device unit are shifted by a phase acquired by dividing 360° by the number of parallel units and in transient load variation, all parallel power supply device units are operated according to a driving pulse of the same phase. Differential voltage is used for sharing current to prevent the unbalance of current by the dispersion of circuit components of each power supply device unit in this case and the dispersion of reference voltage, and the control operation of other power supply device units is matched with maximum differential voltage out of differential voltage of each power supply device unit.

Referring to the drawings, the embodiments of the invention will be described in detail below.

First Embodiment

FIG. 1 shows a power-supply device equivalent to this embodiment.

As shown in FIG. 1, Vi denotes an input terminal and Vo denotes an output terminal. Upper-side power MOSFET Q1 is connected to the input terminal Vi and lower-side power MOSFET Q2 is connected to the ground side. An LC smoothing filter which is a power output filter and which is composed of an inductor L and a capacitor Co, a CR smoothing filter composed of a resistor R and a capacitor C and a second CR smoothing filter composed of a resistor R5 and a capacitor C5 are connected to an intermediate node of power MOSFETs Q1 and Q2 in parallel, further, the output terminal Vo and one input terminal (−) of a differential amplifier AMP are connected to an intermediate node of the LC smoothing filter, one input terminal (−) of an error amplifier EA is connected to an intermediate node of the CR smoothing filter, and the other input terminal (+) of the differential amplifier AMP is connected to an intermediate node of the second CR smoothing filter. The capacitor Co of the LC smoothing filter is a chip ceramic capacitor. As for the inductor L, equivalent series resistance (ESR) existing in the inductor L is shown for the following description. Relation between a time constant T1 of the CR smoothing filter and a time constant T2 of the second CR smoothing filter is T1 << T2 and T2 is set so that T2 is larger by one digit or more than T1. When this relation is expressed by the corner frequency fCR of the CR smoothing filter and the corner frequency fCR2 of the second CR smoothing filter, fCR >> fCR2, and fCR2 can be set so that fCR2 is smaller by one digit or less than fCR.

Reference voltage Vref and the output of the differential amplifier AMP are input to the other input terminal (+) of the error amplifier EA via an adder ADD as new reference voltage Vref'. Each gate of power MOSFETs Q1, Q2 is connected to the output terminal of the error amplifier EA via a pulse-width modulation (PWM) oscillator PWM and a driver DRV. Power MOSFETs Q1, Q2 are driven at a reversed phase and alternately conduct. In this embodiment, output voltage Vout is smaller than input voltage Vin.

Next, circuit operation shown in FIG. 1 will be described. Input voltage Vin applied to the input terminal Vi is converted to voltage via the CR smoothing filter by the on-off control of power MOSFET Q1 and power MOSFET Q2. The converted voltage VFB is compared with new reference voltage Vref' in the error amplifier EA and error voltage is amplified by the output of the error amplifier EA. The error voltage is converted to a PWM pulse in the pulse-width modulation oscillator PWM. The PWM pulse is converted to on/off time ratio (duty: α) in which power MOSFET Q1 and power MOSFET Q2 are driven in the driver DRV, negative-feedback control is performed so that error voltage is zero, and the converted voltage VFB is equal to new reference voltage Vref'. In this case, in a steady state, converted voltage VFB acquired through the CR smoothing filter is proportional to the duty α of input voltage Vin. Therefore, a relational expression VFB=Vref'=α·Vin is met. As the duty α is defined as on time/(the sum of on time and off time), it has a value between 0 and 1.

In the case of a normal step-down converter, as it is known that the transfer factor in a steady state is equal to the rate of output voltage and input voltage, that is, duty, the output of the LC smoothing filter, that is, output voltage Vout acquired at the output terminal Vo is acquired in a relational expression Vout=α19 Vin if input voltage is Vin and the duty is α.

The relation of Vout=Vref'=α·Vin is produced based upon the two expressions. Therefore, as for output voltage, if only the duty α can be indirectly controlled by another method even if the output of the LC smoothing filter is not directly fed back, it is similar to the direct control of output voltage Vout at the output terminal Vo and voltage proportional to the duty α of input voltage Vin is acquired at the output terminal Vo. In other words, desired voltage proportional to the duty α of input voltage Vin can be also acquired at the output terminal of the LC smoothing filter as output voltage Vout by driving power MOSFETs Q1, Q2 and applying negative-feedback control to the output of the CR smoothing filter.

This power supply control system is characterized as a control method of time-lag of first order using the CR smoothing filter for a control loop as voltage conversion means by duty control over power MOSFET Q1 and power MOSFET Q2, as the LC smoothing filter has no second-order lag as in the prior art and the control loop is not a vibration system, no vibrational waveform is output, and the loop is stable. Therefore, according to this embodiment, even if a chip ceramic capacitor ESR of which is small is used for the capacitor of the LC smoothing filter, the control loop can be stabilized. This is a reason that a first-order feedback control system is adopted.

Next, relation in a corner frequency and a switching frequency between the two smoothing filters will be described. When a corner frequency of the CR smoothing filter is fCR, a corner frequency of the LC smoothing filter is fLC and a switching frequency is fSW, the stability of a loop can be secured if fLC<fCR<fSW. As it is known from this relation that an operating frequency is higher in the case of feedback from the CR smoothing filter, compared with a case of feedback from the LC smoothing filter, a high-speed response is enabled. If fLC and fCR are set to frequencies distant to some extent, a constant of the CR smoothing filter is not required to be changed even if a constant of the LC smoothing filter is changed, and a degree of freedom in design can be enhanced. As for high-speed operation in which a switching frequency is 1 to 6 MHz, 0.2 μH, 220 μF and 20 pF, 200 k Ω for example can be used for each constant of the LC smoothing filter and the CR smoothing filter. The constants of the CR smoothing filter of 20 pF and 200 kΩ are a value in case the CR smoothing filter is built in IC (in case the CR smoothing filter is mounted on a chip); however, if only the product of C·R is the same, a value C and a value R can be changed.

This power supply control system is provided with the above-mentioned characteristics; however, when load current Io flows in ESR of the inductor L, a voltage drop is caused by ESR and a phenomenon that the output voltage (a mean value) Vout' of the CR smoothing filter (this voltage is also called converted voltage VFB) and output voltage Vout acquired at the output terminal Vo are not equal occurs. ESR in the following expressions denotes a resistance value of an equivalent series resistor ESR. That is, as known from the relation of Vout=Vout'−ESR×Io, Vout=Vout' only when load current Io is zero. Therefore, it is required to compensate the dependency upon load current of the equivalent series resistor ESR. The second CR smoothing filter is provided for the compensation. Differential voltage (ESR×Io) between the output voltage VCR2 of the second CR smoothing filter and output voltage Vout at the output terminal Vo is extracted using the differential amplifier AMP, is added to reference voltage Vref in the adder ADD, new reference voltage Vref' is generated and is input to the other input terminal (+) of the error amplifier.

As the output voltage Vout' of the CR smoothing filter is higher by ESR×Io by control that difference (ESR×Io) between output voltage Vout and the output voltage Vout' of the CR smoothing filter is added to reference voltage Vref by this method, an effect of the dependency upon load current of the equivalent series resistance ESR emerging in output voltage Vout in a steady state can be compensated.

In this case, it is desirable that differential voltage between the output voltage of the CR smoothing filter and output voltage at the output terminal Vo is used for the differential voltage, however, as the output voltage of the CR smoothing filter is set so that fLC<fCR as described above, a ripple accounts for a large rate in the output voltage and stable differential voltage close to direct current cannot be acquired. Therefore, the second CR smoothing filter provided with a time constant larger than the CR smoothing filter by one digit or more is provided.

FIGS. 2 show the effect of compensation according to the invention. FIG. 2A shows a case without compensation and shows that as load current increases, output voltage Vout decreases. In the meantime, FIG. 2B shows that in case compensation is made as shown in FIG. 2B, output voltage Vout in a steady state is fixedly controlled independent of the increase/decrease of load current by using new reference voltage Vref' depending upon load current shown by a dotted line for reference voltage Vref.

As dependency upon load current by equivalent series resistance ESR of the inductor L emerges in output voltage Vout in case the first-order feedback control power supply system is formed by control IC different from that in the invention and is operated, a characteristic shown in FIG. 2A is acquired and a satisfactory characteristic shown in FIG. 2B which is the object of the invention cannot be acquired.

As described above, in this embodiment, the effect of a voltage drop depending upon load current by the equivalent series resistance ESR of the inductor L is compensated and effect that output voltage is stabilized and can be made fixed is produced.

The case that power MOSFET is used for a semiconductor switching device has been described above; however, another power switching device such as IGBT may be also used in place.

Second Embodiment

FIG. 3 shows another embodiment. In FIG. 3, the same reference number is allocated to the same component as the component shown in FIG. 1. FIG. 3 is different from FIG. 1 in that the output of a differential amplifier AMP is input to one input terminal (−) of an error amplifier EA. Therefore, the output of the differential amplifier AMP is subtracted from the output of a CR smoothing filter using an adder ADD and is input to one input terminal (−) of the error amplifier EA as converted voltage VFB. Hereby, as voltage input to one input terminal (−) of the error amplifier EA is decreased from original converted voltage VFB by the quantity of the output voltage of the differential amplifier AMP, such control that the output voltage Vout of the power supply system is increased by the quantity of the voltage is made. Hereby, output voltage in a steady state can be stabilized and can be made fixed. This functions in the same way as the control shown in FIG. 1 that the output voltage Vout of the power supply system is enhanced using new reference voltage acquired by adding the output voltage of the differential amplifier AMP to reference voltage, and the similar effect to the effect shown in FIG. 1 is acquired.

Third Embodiment

Figure 4:
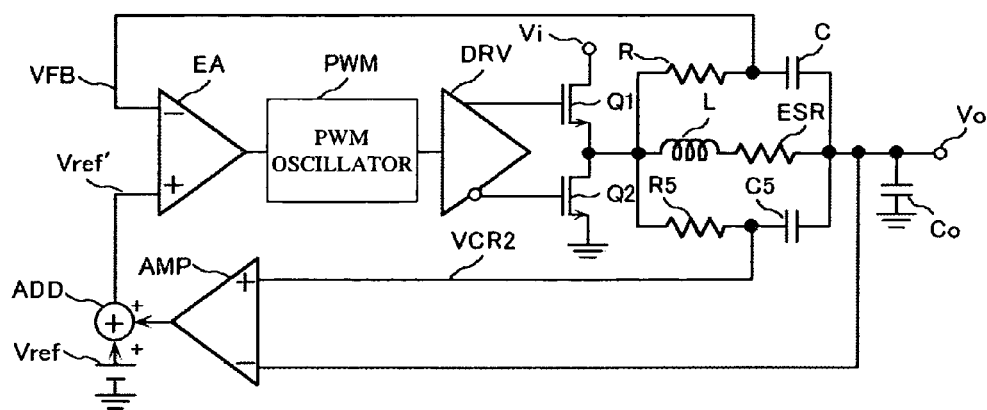
FIG. 4 is a circuit block diagram showing a power-supply device equivalent to another embodiment of the invention.

FIG. 4 shows further another embodiment. FIG. 4 is different from FIG. 1 in that a CR smoothing filter and a second CR smoothing filter are connected to both ends of an inductor L of an LC smoothing filter. In this embodiment, as the capacitance of a capacitor Co of the LC smoothing filter is large, the side of the end connected to the inductor of the capacitor Co can be also regarded as ground. In this embodiment, the similar effect to that shown in FIG. 1 is also acquired. In this case, the constants used in the first embodiment shown in FIG. 1 can be also used for constants of the CR smoothing filter and the second CR smoothing filter.

Besides, in this embodiment, the output voltage of a differential amplifier AMP can be also input to one input terminal (−) of an error amplifier EA as shown in FIG. 3.

Further, for the configuration of the CR smoothing filter and the second CR smoothing filter, the combination of the embodiments shown in FIGS. 1 and 4 is also enabled and the similar effect to that shown in FIGS. 1 and 4 can be expected.

Fourth Embodiment

Figure 5:
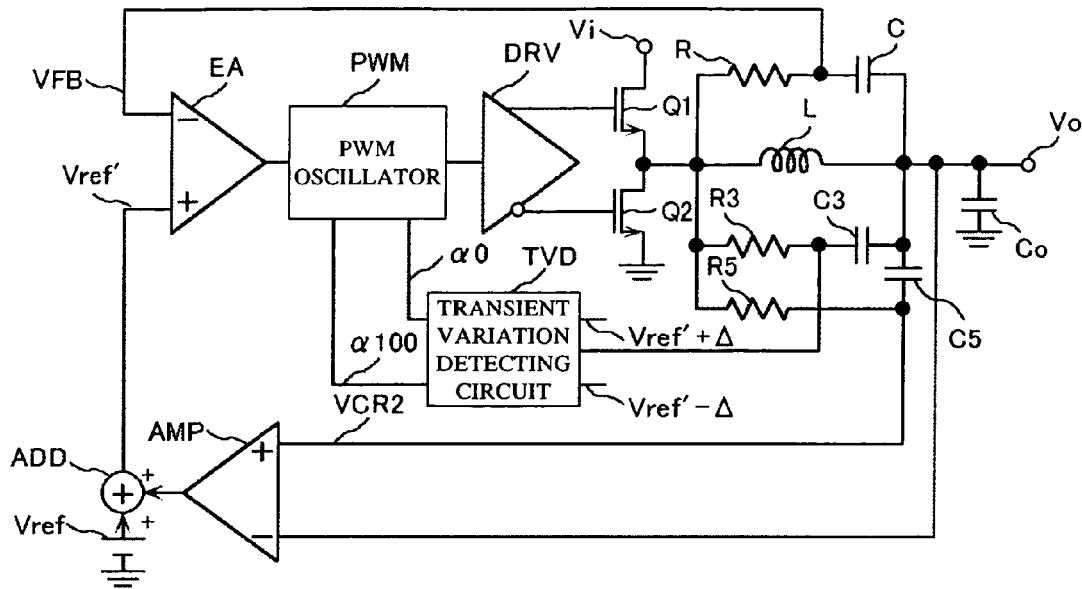
FIG. 5 is a circuit block diagram showing a power-supply device equivalent to another embodiment of the invention.
Figure 6:
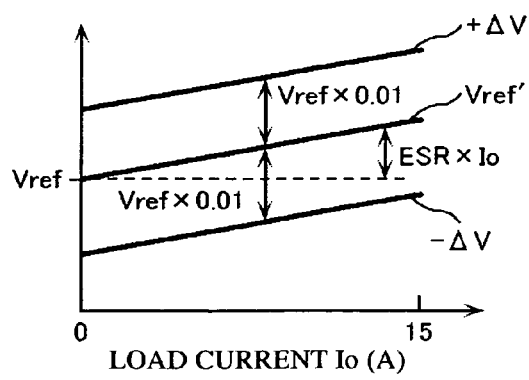
FIG. 6 is an explanatory drawing for explaining width between the upper and lower limit voltage of load current in the power-supply device shown in FIG. 5.

FIG. 5 shows a power supply system in which a transient variation detecting circuit TVD is further added to the power supply system described in the third embodiment. The transient variation detecting circuit TVD detects transient load variation between the mid voltage of a series circuit composed of a capacitor C3 and a resistor R3 respectively newly provided to both ends of an inductor L of an LC smoothing filter and voltage acquired by adding upper/lower limited voltage width ±Δ to new reference voltage Vref', and the duty of a pulse-width modulation oscillator PWM is controlled. FIG. 6 shows an example in which the upper/lower limit voltage width ±Δ used in this embodiment is set. In FIG. 6, a method of setting Δ to 1% of original reference voltage Vref for example according to new reference voltage because the new reference voltage Vref' varies according to load current Io is known. In addition, a method of setting Δ to a fixed value, 20 mV for example independent of a value of original reference voltage Vref is conceivable. The latter method is considered to be effective because in case output voltage decreases and output voltage of 1 V or less is required, an allowable voltage variation range requested for the output voltage is not proportional to the magnitude of output voltage and is substantially fixed. In this embodiment, as upper/lower limit voltage width ±Δ is set based upon new reference voltage depending upon load current and a transient variation detection level varies, effect that detection sensitivity for transient variation is enhanced and a stable and optimum high-speed response can be achieved is produced.

Figure 7:
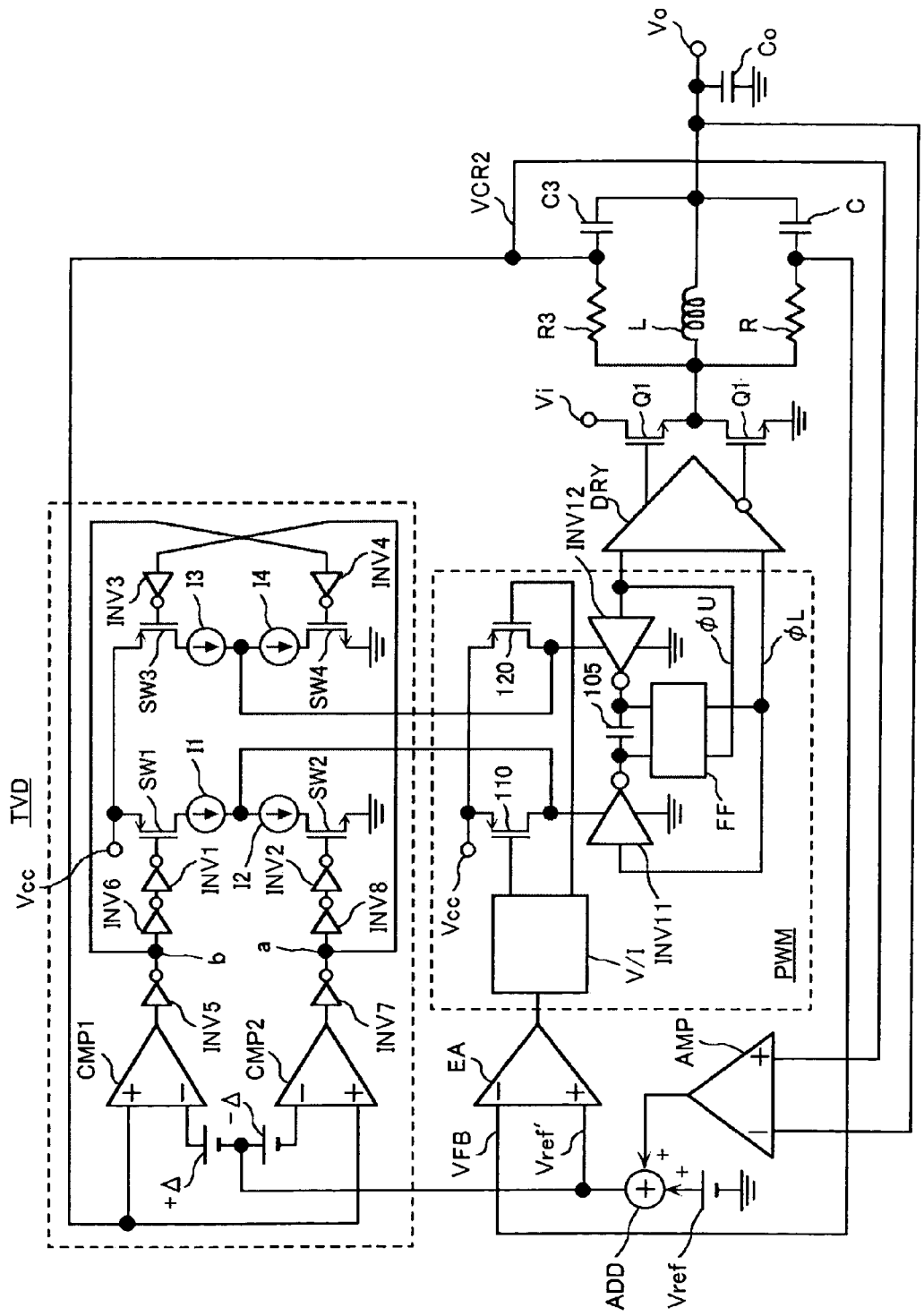
FIG. 7 is a circuit diagram showing the details of FIG. 5.

Next, FIG. 7 shows a concrete example of the pulse-width modulation oscillator PWM and the transient variation detecting circuit TVD.

As shown in FIG. 7, the pulse-width modulation oscillator PWM is a variable oscillator provided with a voltage/current converter circuit V/I, current source MOS 110, 120, inverters INV11, INV12, a capacitor 105 and a flip-flop FF. The transient variation detecting circuit TVD is provided with comparators CMP1, CMP2, switching MOS SW1 to SW4, constant-current sources I1 to I4 and inverters INV1 to INV8.

Figures 8, 9:
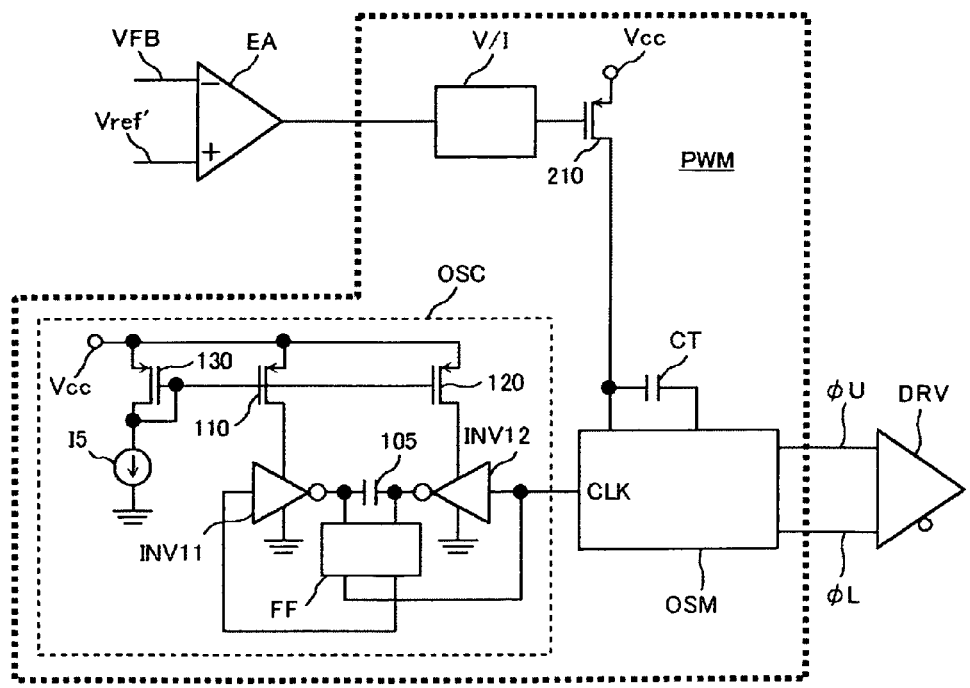
FIG. 8 shows a working state mode shown in FIG. 7.
FIG. 9 is an explanatory drawing showing another embodiment of a pulse-width modulation oscillator PWM.

The transient variation detecting circuit TVD is provided with the two comparators CMP1, CMP2, compares the mid voltage of the series circuit composed of the capacitor C3 and the resistor R3 respectively provided to both ends of the inductor L of the LC smoothing filter with voltage acquired by adding upper/lower limit voltage width ±Δ to new reference voltage Vref', detects an operational state of output voltage Vout and determines the pulse duty α of the pulse-width modulation oscillator PWM shown in FIG. 8. This means switching each control method in a steady state and in transient load variation (when a load suddenly varies) to a control mode matched with an operational state in the transient variation detecting circuit TVD.

Three types of information of (a) a case that load current suddenly decreases, (b) a steady state and (c) a case that load current suddenly increases is acquired from the output of the two comparators CMP1, CMP2. Referring to FIG. 8, these cases will be described below.

In (a), a condition of Vout≧(Vref'+Δ) is shown. At this time, the output duty of the pulse-width modulation oscillator PWM is forcedly set to 0%. Therefore, switch MOSes SW1 and SW4 are turned on, switch MOSes SW3 and SW2 are turned off, the current of the constant-current source I1 flows to the inverter INV11 together with the current of the current source MOS 110, and as the current of the constant-current source I4 pulls the current of the current source MOS 120, current flowing in the inverter INV12 is turned zero. Therefore, power MOSFET Q1 is turned off, power MOSFET Q2 is turned on, and the duty is turned 0%. In this case, to completely turn the duty α to 0%, it is also desirable that current values of the constant-current sources I1 to I4 are set to the total current of the differential pair operating current of the voltage/current converter circuit V/I.

In (b), a condition of (Vref'+Δ)>Vout>(Vref'−Δ) is shown. In this case, all switch MOSes SW1 to SW4 are turned off and are operated at current ratio determined by control commands from an error amplifier EA. As this current ratio is equal to the ratio of duty, voltage proportional to the duty α of input voltage Vin is acquired as output voltage Vout.

In (c), a condition of Vout≦(Vref'−Δ) is shown and the duty is forcedly turned 100%. In this case, the switch MOSes SW3 and SW2 are turned on, the switch MOSes SW1 and SW4 are turned off, the current of the constant-current source I3 flows to the inverter INV12 together with the current of the current source MOS 120, and as the current of the constant-current source I2 pulls the current of the current source MOS 110, current flowing in the inverter INV11 is turned zero. Therefore, the power MOSFET Q1 is turned on, the power MOSFET Q2 is turned off and the duty is turned 100%. In this case, to completely turn the duty α 100%, it is also desirable that the current values of the constant-current sources I1 to I4 are set to the total current of the differential pair operating current of the voltage/current converter circuit V/I.

In this embodiment, the duty α of the pulse-width modulation oscillator PWM is forcedly switched to 0% or 100% so that voltage Vout generated at an output terminal Vo in transient load variation is within upper/lower limit voltage width ±Δ added to the new reference voltage Vref', and output voltage Vout is rapidly inhibited within Vref' ±Δ. When the state changes to a steady state, output voltage is finally settled to voltage proportional to the duty α of input voltage.

As described above, in this embodiment, as a control mode is automatically switched depending upon a transient load variation state or a steady state, a high-speed response and the stabilization of output voltage in a steady state are compatible even in the transient load variation of approximately 10 A having a high current slew rate (di/dt) of 500 A/μs for example.

Next, referring to FIG. 9, another embodiment of the pulse-width modulation oscillator PWM will be described. A circuit shown in FIG. 9 can be achieved by the combination of an oscillator OSC, a one-shot multivibrator OSM and a V/I converter V/I. A pulse of a fixed cycle generated in the oscillator OSC can set fixed current required to determine a desired cycle of current made to flow in the current source MOSes 110 and 120 of the pulse-width modulation oscillator PWM shown in FIG. 7 depending upon MOS 130 and the constant-current source I5. When the pulse of the fixed cycle is applied to a clock terminal CLK of the one-shot multivibrator OSM, the terminal voltage of a capacitor CT is once turned zero; however, the capacitor CT is charged by current acquired by converting the error voltage of the error amplifier EA in the V/I converter V/I. Time until the charge voltage reaches a predetermined threshold is acquired as a PWM pulse. As described above, a series of pulse width modulation oscillation operation can be repeated. That is, a PWM pulse proportional to the error voltage of the error amplifier EA can be acquired.

The pulse-width modulation oscillator PWM is used as effective means in multi-phase control shown in FIG. 11 and described later. In this case, for multi-phase operation, a phase shift circuit is required to be inserted after the oscillator OSC.

Figure 10:
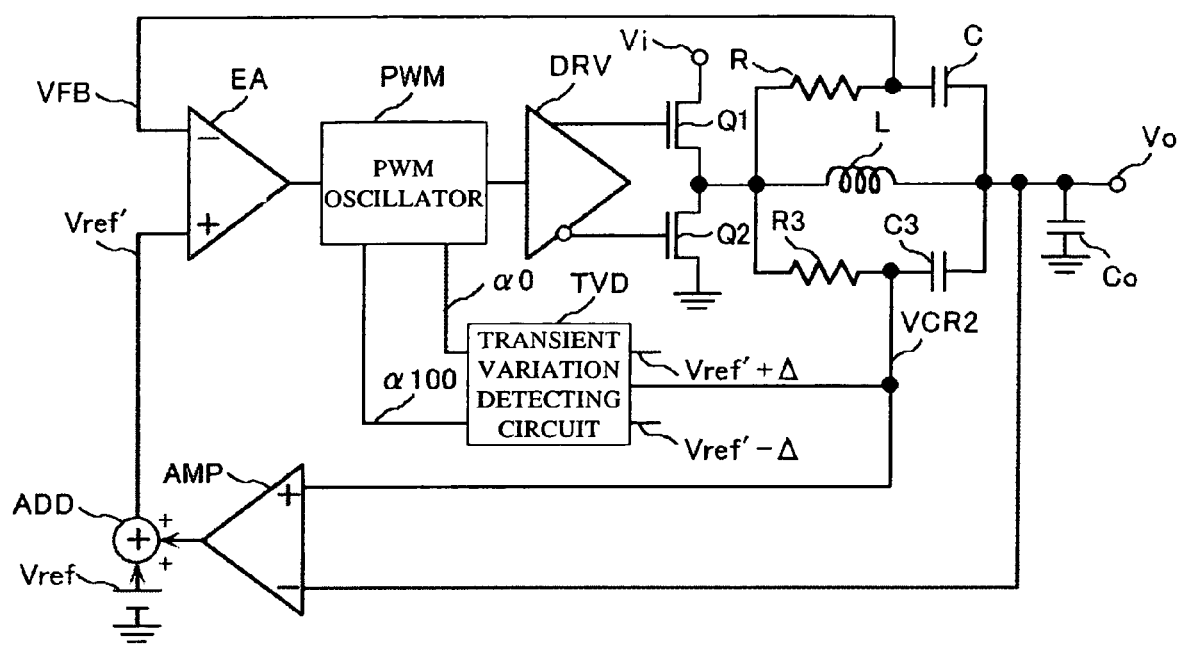
FIG. 10 is a circuit block diagram showing a power-supply device equivalent to another embodiment of the invention.

FIG. 10 shows this embodiment. In FIG. 10, in place of the second CR smoothing filter in the embodiment shown in FIG. 5, a middle point of a series circuit composed of a capacitor C3 and a resistor R3 and the input terminal of a differential amplifier AMP are connected. That is, the series circuit composed of the capacitor C3 and the resistor R3 is used for the second CR smoothing filter. The reason why this configuration is enabled is that as a time constant of the series circuit composed of the capacitor C3 and the resistor R3 is larger than a time constant of the second CR smoothing filter, relation between the time constant described above of the CR smoothing filter and the time constant of the second CR smoothing filter can be sufficiently met. Hereby, as the similar operation and effect to those shown in FIG. 5 are acquired and in addition, the CR smoothing filter can be omitted, effect that the circuit is simplified is also produced.

In the following embodiments in which a series circuit composed of a capacitor C3 and a resistor R3 and a second CR smoothing filter are both used, the part is used for a second CR smoothing filter.

Fifth Embodiment

This embodiment relates to a multi-phase system in which the plural power supply device units in the first to the fourth embodiments are operated in parallel. In this embodiment, two or more of the power supply devices in the first to the fourth embodiments are combined. Two-phase will be described as an example below.

Figure 11:
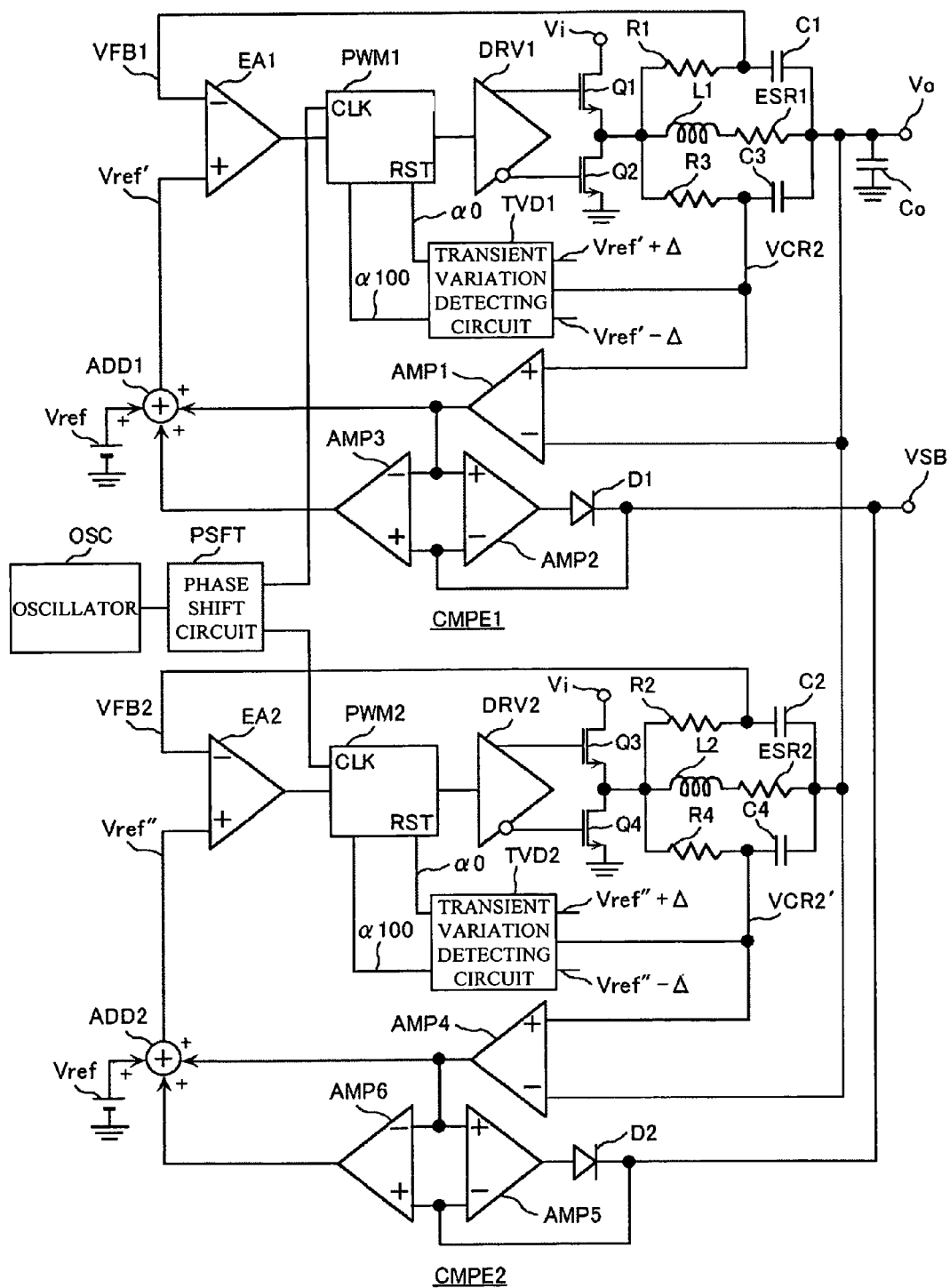
FIG. 11 is a circuit block diagram showing a multi-phase power-supply device equivalent to another embodiment of the invention.

FIG. 11 shows an example in which the power supply device unit shown in FIG. 10 is used for a multi-phase system. In FIG. 11, an oscillator OSC and a phase shift circuit PSFT are newly provided for the multi-phase system, two-phase pulses the phases of which are shifted by 180° are generated by these, are input to pulse-width modulation oscillators PWM1 and PWM2, and multi-phase control is realized.

In this case, the detailed description of the operation of the multi-phase control is omitted, however, in a steady state in multi-phase control operation, inductor currents of two power source device units are operated in opposite phases which are shifted by 180°, in transient load variation, the inductor currents of the two power source device units are in phase and correspond to rapid load variation. Therefore, not only output (load) current can be increased using plural power-supply devices but ripples of output voltage can be reduced.

However, in multi-phase control, output current of each phase is unbalanced by the dispersion of circuit components represented by the inductor and the dispersion of reference voltage. To correspond to this, differential voltage between the output voltage VCR2 of the second CR smoothing filter in the above-mentioned embodiments and output voltage Vout at an output terminal Vo is extracted from a differential amplifier AMP1 and is output to a loop for adding the differential voltage to an adder ADD1, differential voltage between the output of the differential amplifier AMP1 and the output of a maximum value detector composed of a differential amplifier AMP2 and a diode D1 is extracted from a differential amplifier AMP3 and a loop for adding the differential voltage to the adder ADD1 is added, and the output of the adder ADD1 is new reference voltage Vref'. Hereby, as the outputs of the maximum value detectors of each phase are input to a share bus VSB, differential voltage functions so that it increases output current because the differential voltage is output from the differential amplifier AMP3 to another phase which does not have a maximum value of each phase and control is made so that output current of each phase is equal. At this time, as no differential voltage is output to a phase which has a maximum value of each phase from the differential amplifier AMP3, the operation is not operated.

As output current of each phase is balanced by the above-mentioned operation, power MOSFET of large current capacity is not required.

In case more power supply device units than two are provided, an oscillator and a phase shift circuit are provided in common to plural power supply device units, in a steady state, a phase of a driving pulse of upper/lower power MOSFET of each power supply device unit is shifted by a phase acquired by dividing 360° by the number of power supply device units arranged in parallel, and in transient load variation, all parallel power supply device units are operated by driving pulses of the same phase as in (a) and (c) shown in FIG. 8. For example, in the case of four power supply device units, the phases have only to be shifted by 0° (reference), 90°, 180°, 270°.

This embodiment can be applied to not only the power supply device units in the above-mentioned multi-phase control operation to but the parallel operation of plural power supply device units.

Next, an embodiment of the compensation circuit of output voltage will be described. Compensation circuits shown in FIG. 11 are CMPE1 and CMPE2. In case power supply device units are not used in a multi-phase system and are not operated in parallel, the side of a current balance circuit (a part composed of differential amplifiers AMP2 and AMP3 on the side of CMPE1) of the compensation circuits can be also omitted.

Figure 12:
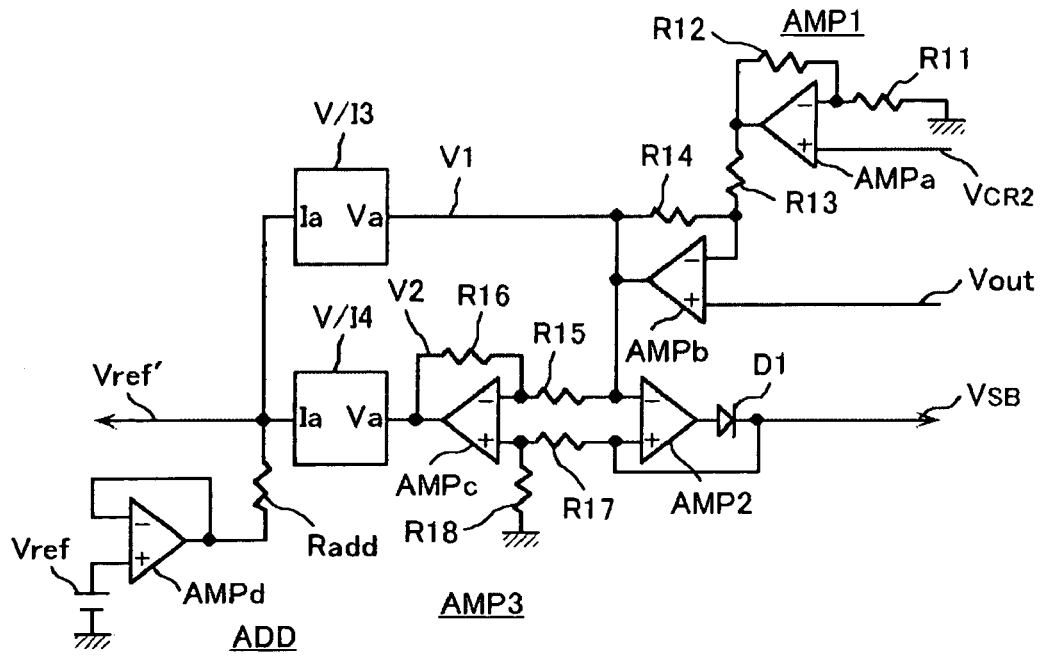
FIG. 12 is a circuit diagram showing the details of the compensation circuit shown in FIG. 11.

FIG. 12 shows one embodiment of the compensation circuit shown in FIG. 11. Differential voltage between the output VCR2 of a second CR smoothing filter and output voltage Vout is acquired as the output V1 of a differential amplifier AMP1 composed of operational amplifiers AMPa, AMPb and resistors R11 to R14 by an expression of $V1=(1+R12/R11) \cdot (VCR2-Vout)$. In this case, as the differential voltage is acquired under a condition of $R11=V13$ and $R12=R14$, it is desirable that $(1+R12/R11)$ is within 10 to 20.

In the meantime, on the side that shares current, differential voltage between the output V1 of the differential amplifier AMP1 and the output of a maximum value detector composed of a differential amplifier AMP2 and a diode D1 is acquired as the output V2 of a differential amplifier AMP3 composed of an operational amplifier AMPc and resistors R15 to R18 by an expression $V2=(R16/R15) \cdot (VSB-V1)$. The differential voltage is acquired under a condition of $R15=R17$ and $R16=R18$; however, it is desirable that $(R16/R15)$ in this case is 1 for example. As Vout is common in each phase, VSB is equivalent to a maximum value of VCR2 of each phase and VSB is expressed by an expression $VSB=(1+R12/R11) \cdot (VCR2max-Vout)$ by replacing VCR2 in the expression of V1 with VCR2max. When this expression is substituted for the expression of V2, an expression $V2=(R16/R15)\ (1+R12/R11) \cdot (VCR2max-VCR2)$ is acquired. Therefore, when it is supposed that the differential voltage of (VCR2−Vout) is the largest in this power supply device unit of each phase, VCR2 in the above-mentioned expression can be substituted for VCR2max and it is conceivable that the compensation gain of this loop is zero.

The adder ADD is composed of voltage/current converter circuits V/I3, V/I4, a resistor Radd and a buffer amplifier AMPd, voltage generated by making current flow in the resistor Radd is added to reference voltage Vref generated at the output terminal of the buffer amplifier AMPd, and new reference voltage Vref' is generated. Therefore, each output voltage V1, V2 of the differential amplifiers AMP1, AMP3 is converted to current via the voltage/current converter circuits V/I3, V/I4 and is made to flow in the resistor Radd.

Figure 13:
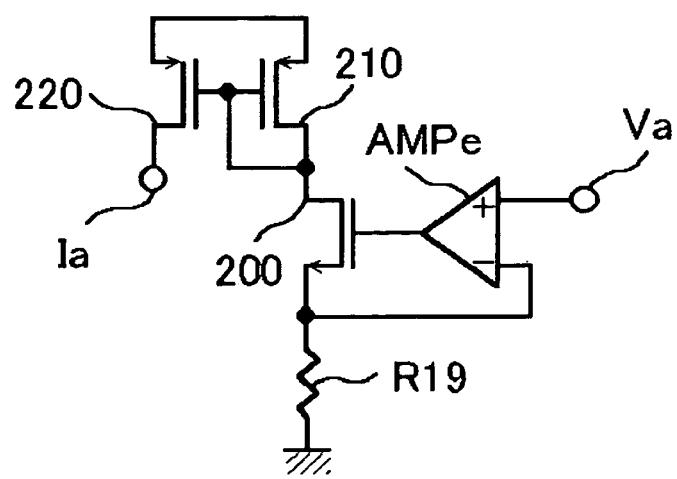
FIG. 13 is a circuit diagram showing the details of the voltage/current converter circuit shown in FIG. 12.

FIG. 13 shows an embodiment of the voltage/current converter circuits V/I3, V/I4. FIG. 13 shows an example composed of an operational amplifier AMPe, MOS 200, a resistor R19 and current mirror MOSes 210, 220, as voltage Va is applied to the resistor R19, current Ia is generated by Va/R19 as a result and is output via the current mirror MOSes 210, 220.

Figure 14:
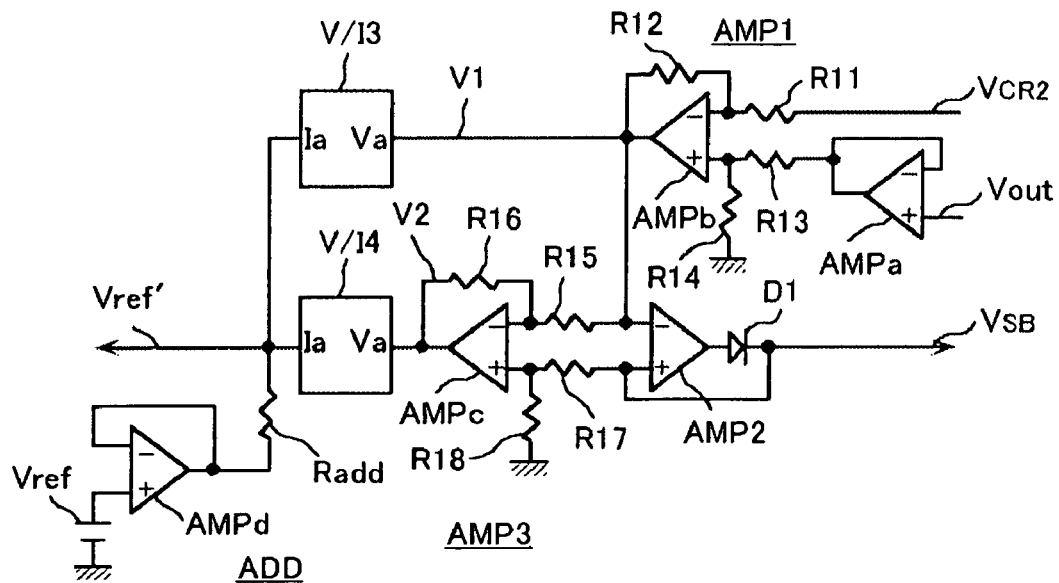
FIG. 14 is a circuit diagram showing the details of a compensation circuit different from that shown in FIG. 11.

Next, FIG. 14 shows another embodiment of the compensation circuit. FIG. 14 is different from FIG. 12 in that the configuration of a differential amplifier AMP1 is changed. As for differential voltage V1 acquired as the output of the differential amplifier AMP1 in this circuit, V1=(R12/R11)·(VCR2−Vout). In FIG. 14, the similar effect to that in FIG. 12 is acquired.

Figure 15:
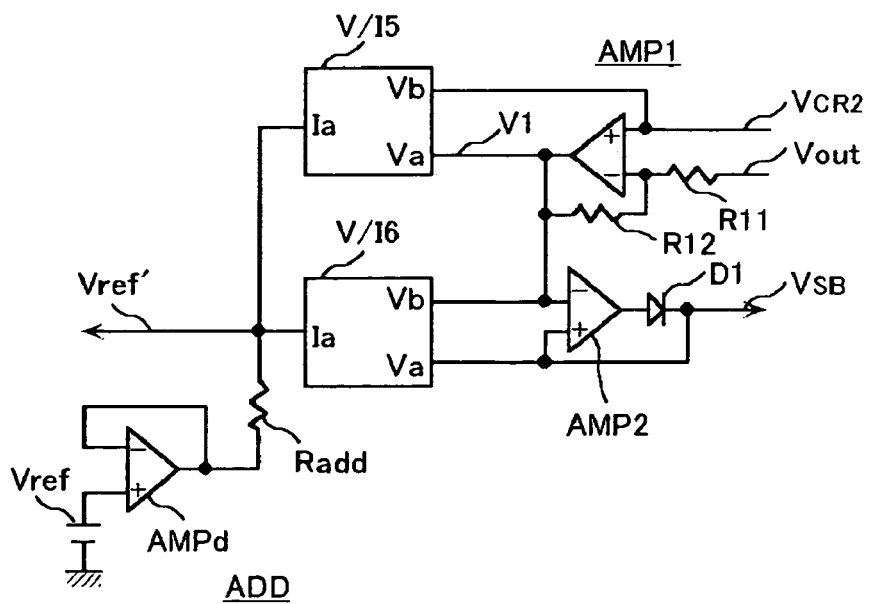
FIG. 15 is a circuit diagram showing the details of a compensation circuit further different from that shown in FIG. 11.

As for the above-mentioned compensation circuit, it is a premise that for the output of the used operational amplifier, 0 V can be handled with simple power supply operation, however, an embodiment shown in FIG. 15 provides a circuit which can realize even if an operational amplifier that cannot handle 0 V is used.

Figure 16:
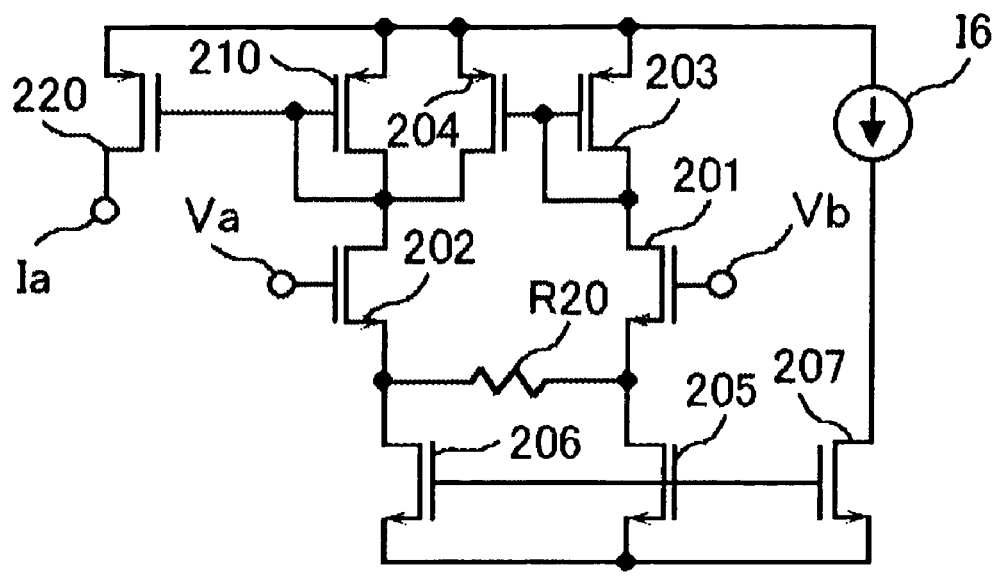
FIG. 16 is a circuit diagram showing the details of the voltage/current converter circuit shown in FIG. 15.
Figure 17:
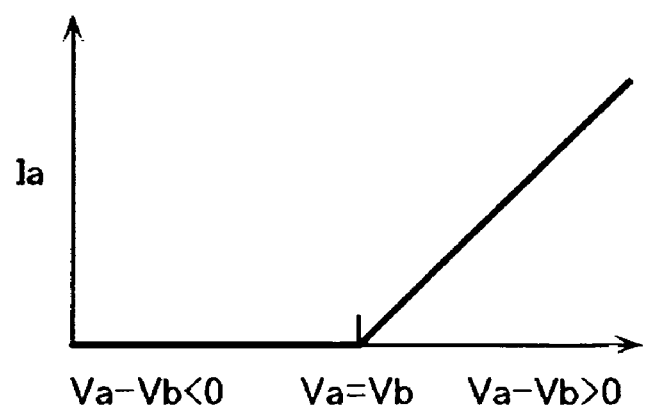
FIG. 17 is an explanatory drawing for explaining the voltage/current converter operation shown in FIG. 16.

In FIG. 15, for voltage V1 acquired at the output terminal of a differential amplifier AMP1, V1=(1+R12/R11)·(VCR2−Vout)+VCR2. For voltage acquired at VSB, VSB=(1+R12/R11)·(VCR2max−Vout)+VCR2max. FIG. 16 shows an example in which differential type voltage/current converter circuits V/I5, V/I6 are applied to delete VCR2, VCR2max in second terms of right sides in the above-mentioned two expressions. In FIG. 16, a maximum value of current made to flow in a resistor Radd is set in a constant-current source I6 and a value of a resistor R20 is used to secure a voltage operation range (a range of differential voltage). Hereby, output current Ia is generated as shown in FIG. 17 in proportion to differential voltage (Va−Vb). In the voltage/current converter circuit V/I6, when differential voltage between two inputs is calculated, it is known that (2+R12/R11)·(VCR2max−VCR2) is acquired and voltage/current conversion gain is increased by approximately 5 to 10%. For a countermeasure of this, a value of the constant-current source I6 is reduced by 5 to 10% or a current slope determined by the resistor R20 is reduced by 5 to 10%. An operational amplifier and a differential amplifier AMP3 forming a differential amplifier AMP1 can be omitted by such configuration and effect that a circuit is simplified is produced.

A compensation circuit is not limited to those in the above-mentioned embodiments and another embodiment may be also made.

Sixth Embodiment

An example of the configuration of an IC chip of a power supply controller according to the invention will be described below.

Figure 18:
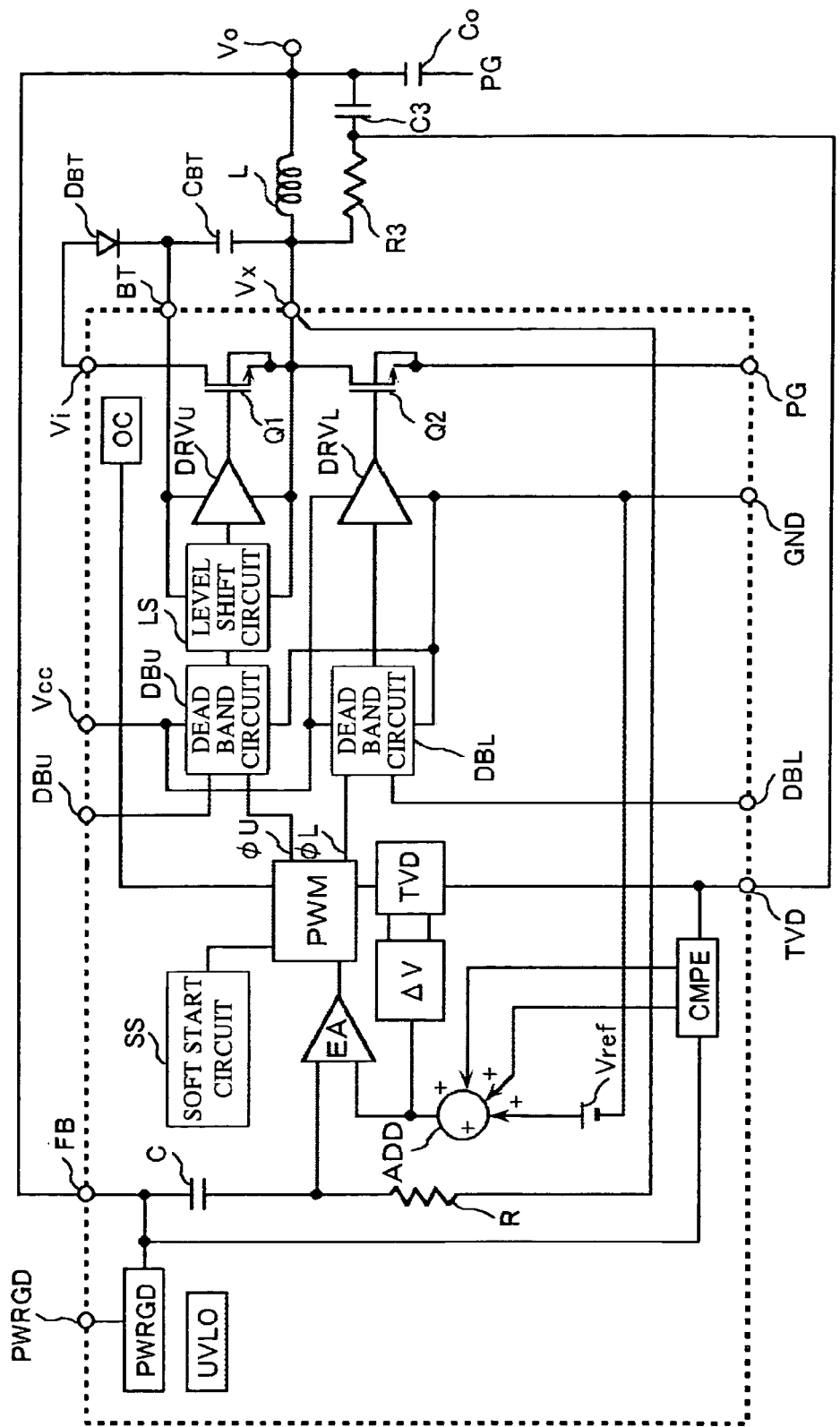
FIG. 18 is a circuit block diagram showing one example of the chip configuration of a power-supply device equivalent to another embodiment of the invention.

FIG. 18 shows an example of the configuration of one chip having the circuit configuration shown in FIG. 10. In FIG. 18, except that an LC smoothing filter, a second CR smoothing filter that provides a required signal to a transient variation detecting circuit TVD and a compensation circuit CMPE of output voltage and is composed of a capacitor C3 and a resistor R3 and a boost circuit composed of a diode DBT and a capacitor CBT are installed outside a chip, a circuit and a function are mounted on one semiconductor substrate as a chip.

For the circuit and the function mounted in the chip, there are a CR smoothing filter composed of a capacitor C and a resistor R, an error amplifier EA, reference voltage Vref, a pulse-width modulation oscillator PWM, dead band circuits DBU, DBL, a level shift circuit LS, drivers DRVU, DRVL, power MOSFETs Q1, Q2, an over current detection circuit OC, a transient variation detecting circuit TVD, an upper/lower limit voltage generator ΔV, a compensation circuit CMPE, an adder ADD, a soft-start circuit SS, an under voltage lock out circuit UVLO and a power good circuit PWRGD. Reference voltage Vref may be also acquired in a D/A converter by receiving a digital signal corresponding to a voltage identification code in the chip in place of being acquired from a band gap reference circuit. Though some of the above-mentioned are not shown, one chip power supply control IC in this embodiment is provided with a function based upon VRM9.1 or VRM10.0 proposed by Intel.

In FIG. 18, a case that power MOSFET Q1 is NMOS is shown, however, it may be also PMOS. In this case, the boost circuit installed outside the chip is not required; however, as a gate of PMOS is required to be driven at potential from an input terminal Vi, a voltage generation source for this is mounted in the chip.

Voltage fed to the input terminal Vi and a power supply terminal Vcc is equalized and 5 V or 12 V for example may be also fed, 12 V may be also fed to the input terminal Vi and 5 V may be also fed to the power supply terminal Vcc. In case voltage fed to the input terminal Vi and the power supply terminal Vcc is different, 5V to the power supply terminal Vcc may be also fed from an external device, 5 V is produced in the chip based upon 12 V to the input terminal Vi and may be also supplied. In case 12 V is fed to the input terminal Vi, the boost circuit shown in FIG. 18 is connected to the diode DBT in series to be Zener diode of approximately 7 V so that the gate voltage of upper power MOSFET is not excessive.

In FIG. 18, in case the feed voltage of the input terminal Vi is 12 V, the output voltage of the power-supply device is 1 V or less, control duty is small and the driving pulse width of power MOSFET cannot be sufficient secured, the feed voltage of the input terminal Vi is not limited to 12 V and the operation is enabled even if the feed voltage is reduced up to approximately 5 V.

Further, in the operation of the soft-start circuit, an output signal of the transient variation detecting circuit for a high-speed response has only to be masked in a state of power on.

This chip is characterized in that the CR smoothing filter for first-order feedback control is built in the chip. Therefore, for the CR smoothing filter, a terminal Vx and a terminal FB for a power supply output terminal Vo are provided to IC.

A signal from the second CR smoothing filter is input to a terminal TVD of IC; however, it is effective to also input this signal to an earth terminal of an output capacitor Co from the viewpoint of preventing noise. In this case, the terminal for ground potential is newly provided to IC next to the terminal TVD.

Seventh Embodiment

Figure 19:
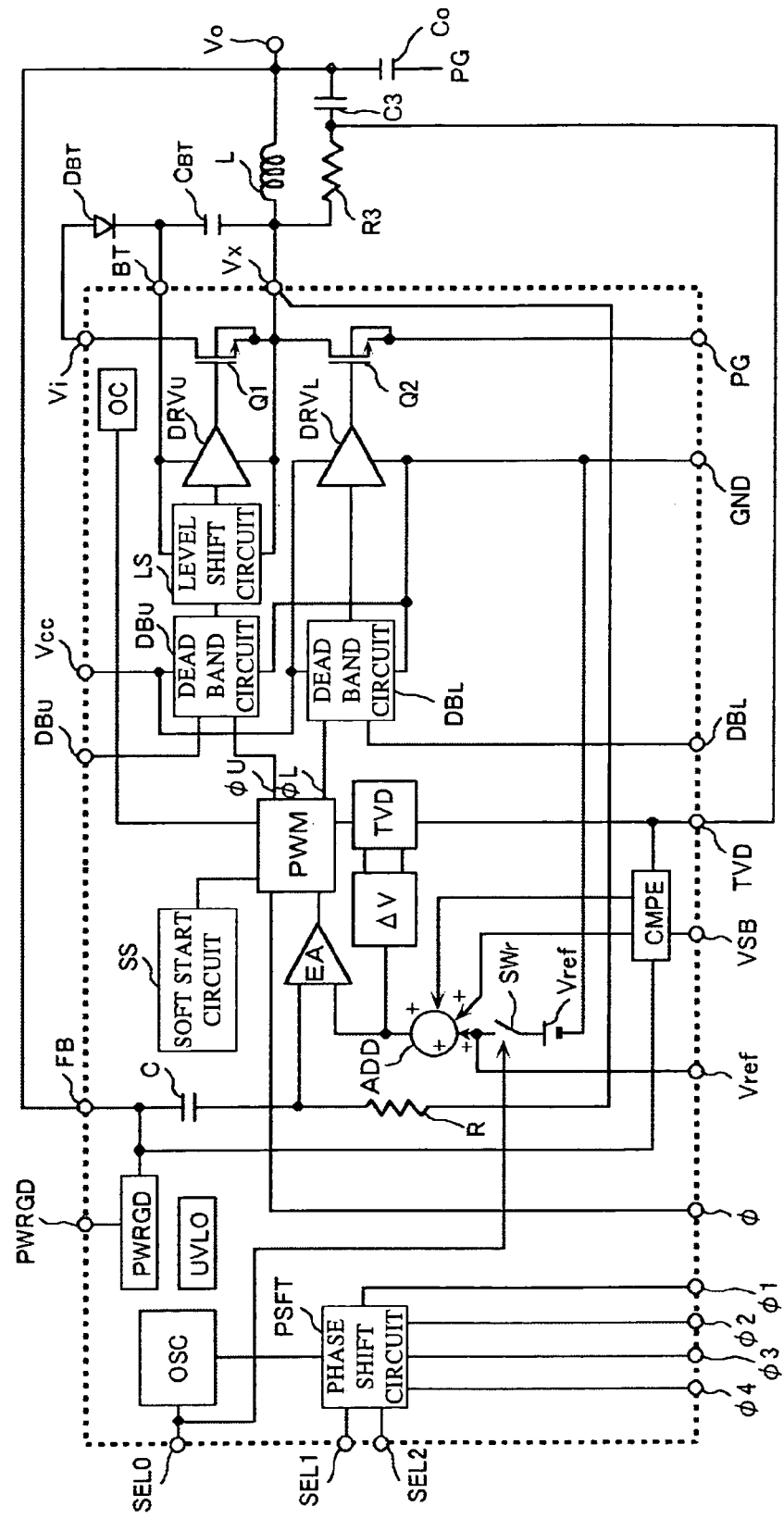
FIG. 19 is a circuit block diagram showing one example of a multi-phase corresponding chip equivalent to another embodiment of the invention.

FIG. 19 shows the configuration of an IC chip corresponding to a multi-phase system in this embodiment. FIG. 19 shows the circuit configuration of the IC chip applied to the multi-phase system and is different from the sixth embodiment shown in FIG. 18 in that an oscillator OSC and a phase shift circuit PSFT are added to the IC chip. For IC pins required for the multi-phase system, there are terminals for providing phase pulses φ1 to φ4 according to the number of multiple phases to the IC chip or another IC chip, reference voltage Vref and a terminal of a share bus VSB for sharing current.

For the configuration of multiple phases, first, IC chips are prepared by the number of desired phases and one IC chip out of them is determined as a master. Concretely, the oscillator OSC and a switch SWr are activated by a selection signal SEL 0 of the master IC chip and the desired number of phases is specified by two bits of selection signals SEL1 and SEL2. Next, when phase pulses φ2 to φ4, reference voltage Vref and the share bus VSB are supplied from the master IC chip, the multi-phase system is achieved by applying φ, Vref and VSB to another IC chip.

In this embodiment, the number of multiple phases is 4, however, the number of phases is not limited and the number of phases can be suitably increased or decreased by changing the number of selection signals for setting the number of phases, changing the phase shift circuit PSFT to circuit configuration in accordance with the number of phases and mounting these in the IC chip.

Figure 20:
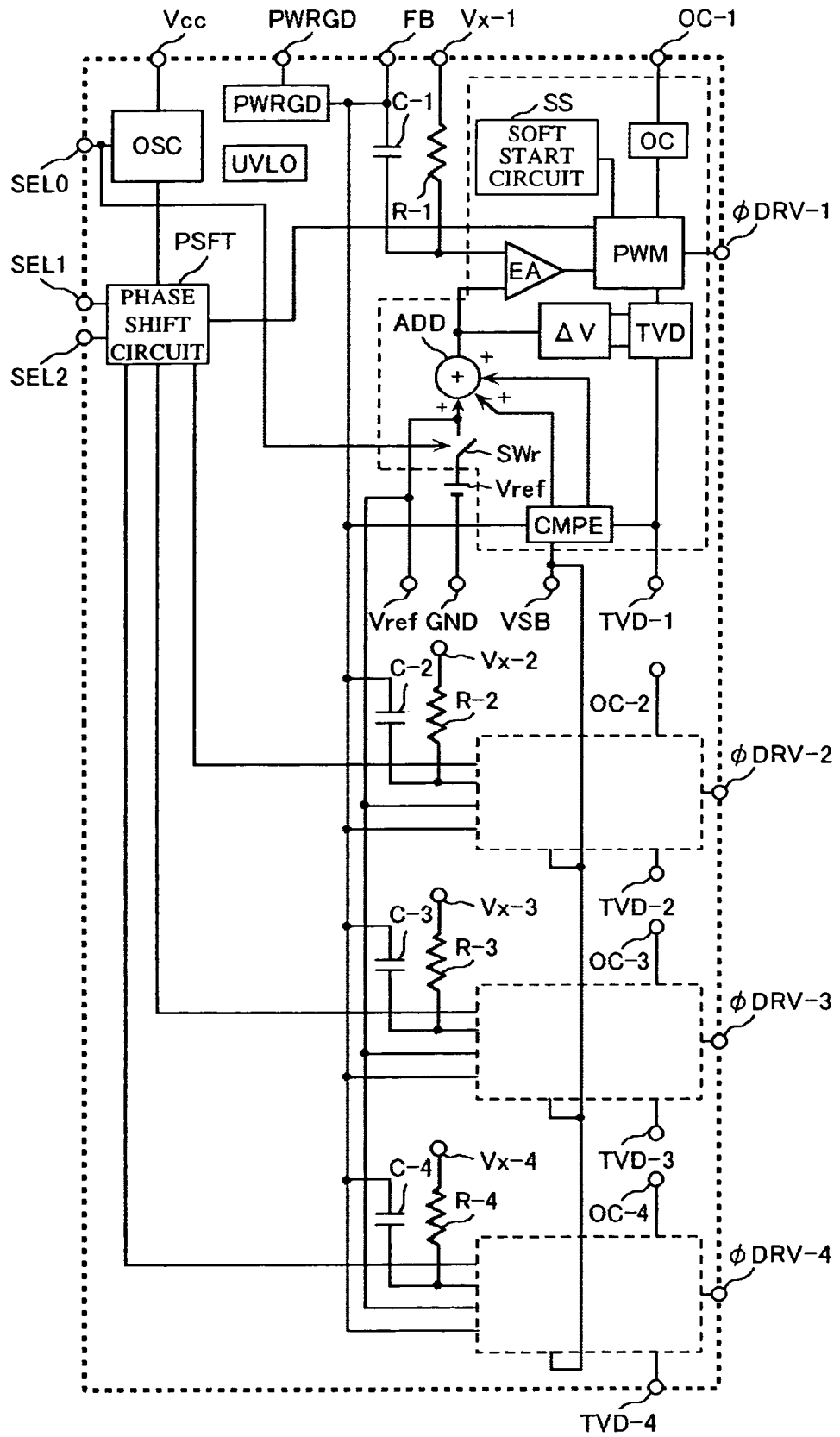
FIG. 20 is a circuit block diagram showing a controller of a multi-phase corresponding chip equivalent to another embodiment of the invention.
Figure 21:
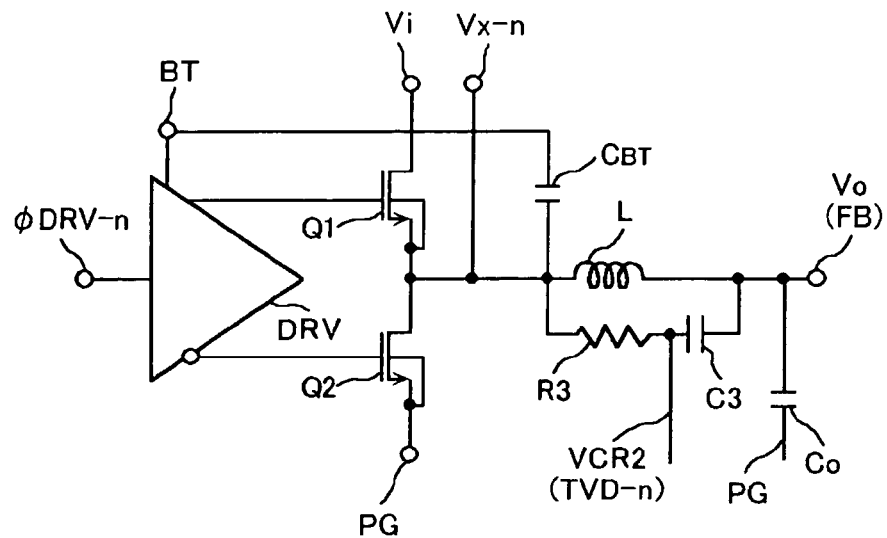
FIG. 21 is a circuit block diagram showing a driver power unit of a multi-phase corresponding chip equivalent to another embodiment of the invention.

Next, FIGS. 20 and 21 show another embodiment of the multi-phase system. FIG. 20 shows an example of a circuit in which a circuit before the pulse-width modulation oscillator PWM shown in FIG. 19, that is, a power supply controller is mounted in IC for four phases. In this case, for a circuit after the pulse-width modulation oscillator PWM, a circuit shown in FIG. 21 is used for four pieces. At this time, each output terminal Vo is connected in common.

In this circuit configuration, a CR smoothing filter for first-order feedback control built in IC is required for each phase, a terminal of one capacitor of each CR smoothing filter is connected to a terminal FB in common; however, a terminal of the other resistor is connected to terminals Vx-1 to Vx-4. In case the CR smoothing filter is a component installed outside the chip, the output of the CR smoothing filter is directly input to one input terminal (−) of an error amplifier EA or is input via a buffer amplifier, and therefore, a network related to the phase compensation of a loop is not required for one input terminal (−) of the error amplifier EA. It is desirable that an operational amplifier used in the error amplifier EA is an internal compensation type operational amplifier.

In FIG. 21, a driver and power MOSFET are mounted in one package; however, they may be also mounted in separate packages.

Eighth Embodiment

Figure 22:
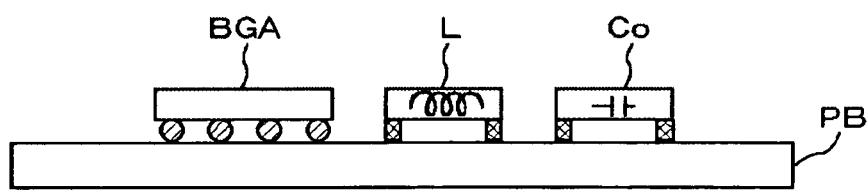
FIG. 22 is an explanatory drawing for explaining a printed wiring board of power-supply control IC equivalent to another embodiment of the invention.

FIG. 22 shows an embodiment in which a power supply control IC chip according to the invention is mounted on a printed wiring board. As shown in FIG. 22, the power supply control IC is a ball grid array (BGA), an inductor L and a capacitor Co are mounted on the printed wiring board PB as a chip component, and small-sized high-density mounting is enabled. The capacitor Co is a chip ceramic capacitor. Though they are not shown, a second CR smoothing filter composed of a capacitor C3 and a resistor R3, a boost circuit and an input capacitor are mounted on the printed wiring board PB as a chip component in this embodiment in addition. In addition to mounting by BGA, the chip may be also mounted in a chip size package (CSP).

Further, in a case corresponding to multiple phases, in addition to mounting plural power supply control ICs in a chip, a multi chip module may be also mounted. In addition, an IC chip including a controller provided with an error amplifier, a pulse-width modulation oscillator and others and an IC chip including a driver including power MOSFET are mounted in a quad flat non-lead (QFN) package and may be also similarly mounted on the printed wiring board.

According to this embodiment, the solution of a pinneck, the enhancement of outgoing radiation and the miniaturization of the power-supply device printed wiring board can be realized.

Ninth Embodiment

Figure 23:
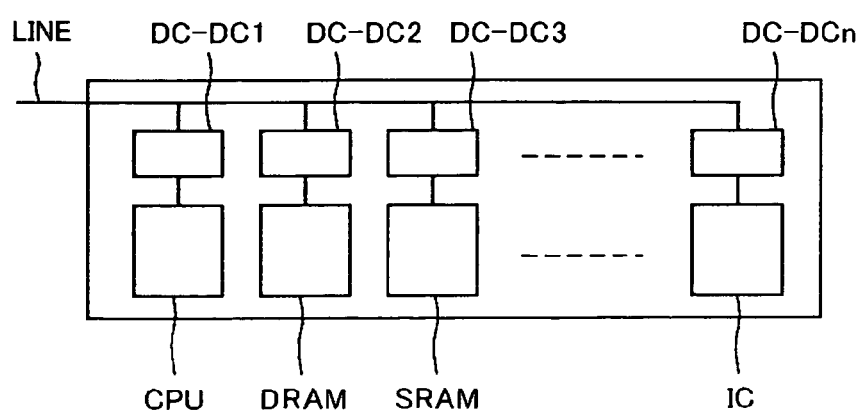
FIG. 23 is an explanatory drawing for explaining on-board power supply for HDD equivalent to another embodiment of the invention.

FIG. 23 shows this embodiment. FIG. 23 shows the embodiment in which the invention is applied to a hard disk drive (HDD). In HDD, the DC-DC converters DC-DC1 to DC-DCn which are the power-supply devices equivalent to the first to eighth embodiments supply power of suitable voltage different every object to a board including processor CPU that makes control for storing data in HDD, the high-speed large-capacity DRAM, SRAM, etc. The DC-DC converters DC-DC1 to DC-DCn which are the power-supply devices shown in FIG. 23 use a single-phase power-supply device and a multi-phase power-supply device according to the current capacity of the processor CPU, the high-speed large-capacity DRAM, SRAM, etc. to which power is to be supplied.

In the above-mentioned embodiments, only the power-supply devices have been described, however, the power-supply device according to the invention can be applied to various applications. Particularly, the performance of a hard disk drive can be enhanced by mounting the power-supply device in the hard disk drive for which the stability of output voltage and high speed are required.

According to the above-mentioned embodiments, effect that a voltage drop by ESR emerging in output voltage in a loop of first-order feedback can be compensated is produced by extracting the voltage drop by ESR of the inductor L depending upon load current as differential voltage between the output of the second CR smoothing filter and the power supply output at the output terminal, adding the differential voltage to original reference voltage and using it for new reference voltage.

Besides, to correspond to a high-speed response when a load suddenly varies, as a transient variation detection level depending upon load current can be set by setting upper/lower limit voltage width using new reference voltage for the center voltage of the transient variation detection level, effect that detection sensitivity is enhanced and a stable and optimum high-speed response can be achieved is produced.

Further, effect that the unbalance of current between each power-supply device caused by multi-phase operation by plural power-supply devices and the dispersion of power supply circuit components in parallel operation can be reduced is produced.

Besides, the control system according to the invention can be also applied to an isolation type DC-DC converter and can be also applied to an isolation type DC-DC converter such as a single-transistor forward type converter, a two-transistor forward type, a push-pull type, a half bridge type and a full bridge type.

It need scarcely be said that the power-supply devices equivalent to the first to eighth embodiments can be applied to VRM, a DC-DC converter for portable equipment and a general-purpose DC-DC converter though not shown.

What is claimed is:

1. A power-supply device of a step-down type DC-DC converter provided with a power semiconductor switching device, driving means of the power semiconductor switching device, a pulse-width modulation oscillator that supplies a driving signal to the driving means and an error amplifier that supplies an error signal with reference voltage to the oscillator, comprising:

a power output filter that passes output power; and
first and second filters provided separately from the power output filter, wherein:
the first filter and one input terminal of the error amplifier are connected;
differential voltage between the output of the second filter and the output of the power output filter is added to the reference voltage; and voltage acquired by the addition is input to the error amplifier.

2. The power-supply device according to claim 1, wherein:
the power output filter is an LC filter provided with an inductor and a capacitor;
the first and second filters are a CR filter provided with a capacitor and a resistor; and
the first and second filters are provided in parallel with the power output filter.

3. The power-supply device according to claim 2, wherein:
differential voltage between the second filter and the power output filter is subtracted from the output voltage of the first filter and is input to the input terminal of the error amplifier; and
the reference voltage is input to the other input terminal of the error amplifier.

4. The power-supply device according to claim 2, wherein:
each frequency of the first and second filters is fCR, fCR2;
when a frequency of the power output filter is fLC, fLC<fCR; and
relation that fCR2 is smaller than fCR by one digit or more is met.

5. The power-supply device according to claim 4, comprising:
a transient variation detecting circuit, wherein:
the transient variation detecting circuit detects output voltage from an output terminal of a CR circuit provided to both ends of the inductor of the power output filter;
in case the output voltage exceeds a predetermined upper limit value, a signal for setting the duty of the pulse-width modulation oscillator to 0% is output; and
in case the output voltage is equal to or smaller than a predetermined lower limit value, a signal for setting the duty of the pulse-width modulation oscillator to 100% is output.

6. The power-supply device according to claim 5, wherein:
a center of the predetermined upper and lower limit values of the transient variation detecting circuit is determined based upon voltage acquired by the addition.

7. The power-supply device according to claim 5, wherein:
width between the predetermined upper and lower limit values is set according to the ratio of the reference voltage before the addition or is set to fixed voltage.

8. The power-supply device according to claim 5, wherein:
the transient variation detecting circuit shares the CR circuit provided to both ends of the inductor of the power output filter with the second filter; and
the CR circuit functions as a second CR filter.

9. A power-supply device, wherein:
the power-supply device according to claim 4 is applied to an isolation type DC-DC converter.

10. The power-supply device according to claim 1, wherein:
the power output filter is an LC filter provided with an inductor and a capacitor;
the first and second filters are a CR filter provided with a capacitor and a resistor;
the first and second filters are provided to both ends of the inductor of the power output filter and the first filter is connected to an input terminal of the error amplifier;
differential voltage between the second filter and the power output filter is added to the reference voltage; and
voltage acquired by the addition is input to the error amplifier.

11. The power-supply device according to claim 1, wherein:
the power semiconductor switching device, the driving means of the power semiconductor switching device, the pulse-width modulation oscillator, the error amplifier and a transient variation detecting circuit that detects output voltage from an output terminal of the power output filter, outputs a signal for turning the duty of the pulse-width modulation oscillator to 0% in case the output voltage exceeds a predetermined upper limit value and outputs a signal for turning the duty of the pulse-width modulation oscillator to 100% in case the output voltage is a predetermined lower limit value or less are mounted on the same semiconductor substrate.

12. An IC, wherein:
the power-supply device according to claim 1 is built in a semiconductor chip.

13. A power-supply device provided with plural power supply device units of a step-down type DC-DC converter provided with a power semiconductor switching device, driving means of the power semiconductor switching device, a pulse-width modulation oscillator that supplies a driving signal to the driving means and an error amplifier that supplies an error signal with reference voltage to the oscillator, wherein:
the plural power supply device units are respectively provided with a power output filter that passes output power and first and second filters provided separately from the power output filter;
the first filter and one input terminal of the error amplifier are connected;
differential voltage between the output of the second filter and the output of the power output filter is added to the reference voltage; and
voltage acquired by the addition is input to the error amplifier.

14. The power-supply device according to claim 13, wherein:
to operate the plural power supply device units in parallel, the pulse-width modulation oscillator is shared among the plural power supply device units;
the phase of the output of the pulse-width modulation oscillator shifts; and
a signal the phase of which shifts is supplied to the plural power supply device units.

15. The power-supply device according to claim 14, wherein:
the plural power supply device units are respectively provided with a transient variation detecting circuit;
the transient variation detecting circuit detects output voltage from the output terminal of the power output filter;
in case the output voltage exceeds a predetermined upper limit value, a signal for setting the duty of the pulse-width modulation oscillator to 0% is output; and
in case the output voltage is equal to or smaller than a predetermined lower limit value, a signal for setting the duty of the pulse-width modulation oscillator to 100% is output.

16. The power-supply device in multi-phase operation or in parallel operation according to claim 13, wherein:

to share current between/among plural power supply device units, a maximum value of differential voltage between the output of a second filter and the output of the power output filter in each power supply device unit is detected via a common bus; and difference between the maximum value of the differential voltage and differential voltage in each power supply device unit between the output of the second filter and the output of the power output filter is added to voltage acquired by the addition.

17. A hard disk drive provided with a magnetic storage disk, a magnetic head, a magnetic-disk rotating device, a magnetic-head drive, a magnetic-head position controller, an input/output signal controller and a power-supply device that supplies power, wherein:

the power-supply device is a step-down type DC-DC converter power-supply device provided with a power semiconductor switching device, driving means of the power semiconductor switching device, a pulse-width modulation oscillator that supplies a driving signal to the driving means and an error amplifier that supplies an error signal with reference voltage to the oscillator; and the power-supply device provided with a power output filter that passes output power and first and second filters provided separately from the power output filter wherein the first filter and one input terminal of the error amplifier are connected, differential voltage between the output of the second filter and the output of the power output filter is added to the reference voltage, voltage acquired by the addition is input to the error amplifier, the power output filter is an LC filter composed of an inductor and a capacitor, the first and second filters are a CR filter composed of a capacitor and a resistor, the first and second filters are provided in parallel with the power output filter, when frequencies of the first and second filters are fCR, fCR2 and a frequency of the power output filter is fLC, fLC<fCR and relation that fCR2 is smaller than fCR by one digit or more is met and output is fed back to the error amplifier via the first and second filters is provided.

* * * * *